United States Patent [19]

Demas et al.

[11] Patent Number: 4,845,368

[45] Date of Patent: Jul. 4, 1989

[54] METHOD FOR THE SUBSTANTIAL REDUCTION OF QUENCHING EFFECTS IN LUMINESCENCE SPECTROMETRY

[75] Inventors: James N. Demas, Charlottesville, Va.; Wesley M. Jones; Richard A. Keller, both of Los Alamos, N. Mex.

[73] Assignee: The United States of America as represented by the United States Department of Energy, Washington, D.C.

[21] Appl. No.: 68,005

[22] Filed: Jun. 26, 1987

[51] Int. Cl.[4] .............................. G01T 1/204
[52] U.S. Cl. .................... 250/459.1; 250/328
[58] Field of Search ............ 250/459.1, 328, 364; 436/172

[56] References Cited

U.S. PATENT DOCUMENTS

| 4,029,401 | 6/1977 | Nather | 250/328 |
| 4,075,480 | 2/1978 | Horrocks | 250/328 |
| 4,085,325 | 4/1978 | Attallah et al. | 250/328 |
| 4,661,705 | 4/1987 | Horrocks | 250/328 |

OTHER PUBLICATIONS

"Enhancement of Luminescence and Raman Spectroscopy by Phase-Resolved Background Suppression", by Demas, J. N. et al., *Analytical Chemistry*, Feb. 1985, vol. 57, pp. 538–545.

"Elimination of Quenching Effects in Luminescence Spectrometry by Phase, Resolution", by Demans, J. N. et al., *Analytical Chemistry*, Jul. 1986, vol. 58, pp. 1717–1721.

*Primary Examiner*—Janice A. Howell
*Assistant Examiner*—William F. Rauchholz
*Attorney, Agent, or Firm*—Samuel M. Freund; Paul D. Gaetjens; Judson R. Hightower

[57] ABSTRACT

Method for reducing quenching effects in analytical luminescence measurements. Two embodiments of the present invention are described which relate to a form of time resolution based on the amplitudes and phase shifts of modulated emission signals. In the first embodiment, the measured modulated emission signal is substantially independent of sample quenching at sufficiently high frequenices. In the second embodiment, the modulated amplitude and the phase shift between the emission signal and the excitation source are simultaneously measured. Using either method, the observed modulated amplitude may reduced to tis unquenched value.

7 Claims, 3 Drawing Sheets

METHOD FOR THE SUBSTANTIAL REDUCTION OF QUENCHING EFFECTS IN LUMINESCENCE SPECTROMETRY

The present invention relates generally to luminescence spectrometry, and more particularly to the elimination of quenching effects of species present in a sample of luminescent species under investigation. This invention is the result of a contract with the Department of Energy (Contract No. W-7405-ENG-36).

BACKGROUND OF THE INVENTION

Luminescence spectrometry is a pervasive analytical procedure having exceptionally high sensitivity and selectivity. Luminescence measurements are, however, subject to errors caused by quenching species present in the sample under investigation. Such species reduce the luminescence signal and, if not compensated for, result in low concentration estimates for the luminescent species. Problems of quenching are especially severe in complex media such as biological, mineralogical, or environmental samples where the nature and amounts of quenching species are often unknown and not readily controlled.

There are several approaches to the elimination of luminescence quenching effects: dilution, standard addition, and back extrapolation of luminescence decays or correction for the degree of quenching. In the dilution approach the sample is diluted until the quenching species concentration is too low to affect the luminescence intensity. In the standard addition method a known concentration of the luminescent species is added, and the emission intensity is remeasured. Since the luminescence of the standard is quenched to the same extent as that of the unknown, the concentration of the unknown can be readily inferred. In the decay method the sample is excited with a short-duration light pulse, and the decay curve is extrapolated back to the time of the exciting flash. The extrapolated signal may be related directly to the concentration of the luminescent species and is independent of quenching. Alternatively, the observed intensity is corrected for quenching from the measured lifetime.

All three methods have weaknesses and merits. All fail if the quenching is too large. Sample purification before analysis is then mandated. Dilution is simple, but requires additional sample handling and is suitable only if the concentrations of the luminescent species are sufficiently high so that dilution does not reduce the signal intensity below the analytically useful range. Finally, without a priori knowledge of the degree of quenching, the degree of dilution must be established experimentally.

Standard addition does not depend on knowledge of the extent of quenching. However, sample handling is relatively labor intensive since it requires at least two measurements, and the method does not readily lend itself to on-line processing.

The decay methods avoid additional sample handling and eliminate errors arising from sample scatter and from short-lived luminescence. However, the instrumentation is elaborate and expensive, and the significant computational requirements often prevent its use for real-time analytical procedures.

Phase-resolved spectroscopy has been used to reduce interfering signals in the determination of the concentration of one or more components of interest by means of direct supression or resolution of the unwanted signal such as scattered light or fluorescent background. For mixtures of emitters having different fluorescent lifetimes, the total phase-resolved intensity is the sum of the individual contributions. The advantage of phase-resolved fluorimetry is that multiple detector phase angles can be used instead of or in addition to multiple wavelengths to generate sufficient information for the determination of multiple unknown concentrations. Even components with identical spectra can be simultaneously determined by the use of different detector phase angles, provided the fluorescing species have sufficiently different fluorescence lifetimes. The basis of this technique is the use of an excitation beam that is modulated at a high frequency. If a mixture of two emitting species A and B is measured with the detector 90° out-of-phase (in quadrature) with component A, for example, the individual spectrum of component B can be obtained. Essentially all of the work performed with phase-resolved fluorescence spectroscopy has involved the resolution of the individual spectra in multicomponent systems. Recently, however, J. N. Demas and R. A. Keller in "Enhancement of Luminescence and Raman Spectroscopy by Phase-Resolved Background Suppression," Anal. Chem. 57, 538 (1985) have suppressed both fluorescence interference in Raman spectra and scattered light interference in fluorescence spectra for cases in which one signal component is very weak relative to the other. There has been no work to date on the use of modulation methods for reducing the effects of chemical species which quench luminescence.

Accordingly, it is an object of the present invention to substantially reduce the effects of quenching species on the luminescence of species of interest.

Another object of the present invention is to provide a method for the quantitative analysis of species by luminescence spectrometry in the presence of quenching species.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention, as embodied and broadly described herein, the method of this invention includes preparing a series of solutions each of which includes a chosen, fixed concentration of the luminescent species of interest and a known concentration of the quenching species, there being solutions with several different concentrations of quenching species, exciting each of the samples in turn with a modulated source of electromagnetic radiation having a chosen wavelength and a chosen modulation frequency, observing the modulated luminescence emission signal from each of the excited samples resulting from the interaction of the modulated electromagnetic radiation with the sample as a function of the chosen frequency, increasing the chosen frequency until the observed emission becomes independent of the extent of quenching and substantially the same for all of the prepared solutions having the same concentration of the luminescent species, observing the modulated emission signal from the sample of interest at the frequency at which the observed modulated luminescence emission becomes substantially independent of the extent of quenching, preparing a series of solutions containing known quantities of luminescent species in the absence of quenching species which covers the range of concentration expected for the sample of interest, determining the unquenched modulated luminescence signal therefrom at the modulation frequency at which the observed modulated luminescence was found to be substantially independent of quenching effects for samples containing quenching species, and determining the concentration of the luminescent species in the sample of interest according to the algorithm:

$$S = S_{0f}\{(1+A^2)/[(1/\phi)^2 + A^2]\}^{\frac{1}{2}},$$

where S is the observed modulated emission amplitude and $S_{0f}$ is the desired unquenched value thereof at the chosen modulation frequency f, $A = 2\pi f \tau_0$, and $\phi$ is the extent of qunching and is equal to $\tau/\tau_0$, where $\tau$ is the quenched excited-state lifetime and $\tau_0$ is the unquenched value thereof, by comparing $S_{0f}$ determined for the sample of interest with the unquenched signal values thereof as a function of concentration of luminescent species. The calibration for the determination of the appropriate modulation frequency and the analytical curve for unquenched samples need be performed at most one time for a particular luminescent species/quenching species system. Moreover, it is to be observed from the relationship between S and $S_{0f}$ set forth hereinabove, that if $A \gg 1/\phi$, $$S \approx S_{0f}[(1+A^2)/A^2]^{\frac{1}{2}} \approx S_{0f}$$

for $A \gg 1$, so that if conditions are chosen conveniently, the measured value for the modulated luminescence emission amplitude is close to the value of the desired unquenched value thereof. Additionally, the modulation frequency appropriate for the substantial reduction of the effects of the quenching species may be determined either from a knowledge of the quenched lifetime of the luminescent species or from an experimental determination thereof as described hereinabove. Finally, it is important to recognize that the $S_{0f}$ values measured from the analytical curve generated from the prepared unquenched samples must be measured at some modulation frequency in order that a meaningful comparison can be achieved.

In a further aspect of the present invention, in accordance with its objects and purposes, the method hereof also includes preparing a series of solutions having known concentrations of luminescent species in the range expected for the unknown sample under investigation and measuring the unquenched modulated luminescence emission amplitude therefor by irradiating each solution in turn with modulated electromagnetic radiation having a chosen wavelength at a modulation frequency determined by the relationship $2\pi f \tau_0 \approx 1$ in order to generate an analytical curve for the luminescent species, exciting the sample of interest with a modulated source of electromagnetic radiation at the appropriate modulation frequency, simultaneously measuring the modulated amplitude of the emission signal, and the phase shift, $\delta$, of the emission relative to the excitation source, determining $\tau_0$ from a measurement of $\delta_0$, the unquenched phase shift, using one of the solutions prepared for said step of measuring the unquenched modulated amplitude according to the relationship $\delta_0 = \tan^{-1}(2\pi f \tau_0)$, and determining the concentration of luminescent species in the sample of interest according to the algorithm:

$$S = (P^2 + Q^2)^{\frac{1}{2}}, \text{ and } \delta = \tan^{-1}(Q/P),$$

where P and Q are the in-phase and quadrature signals measured using a phase-sensitive detector, and $\delta$ is the phase shift of signal relative to the reference signal and is equal to $\tan^{-1}(2\pi f \tau)$, S is the modulated amplitude which is related to the unquenched modulated amplitude according to:

$$S = S_0/[(1/\phi)^2 + A^2]^{\frac{1}{2}},$$

where $S_0$ is the desired unquenched modulated emission amplitude for the sample of interest, $A = 2\pi f \tau_0$, and $\phi$ is the extent of quenching and is equal to $\tau/\tau_0$, where $\tau$ is the quenched excited-state lifetime and $\tau_0$, is the unquenched value thereof, by comparing the calculated value of $S_0$ for the sample under investigation with the unquenched modulated luminescence emission values as a function of concentration of luminescent species determined from the analytical curve as described hereinabove. Again, as for the first embodiment of the present invention, the analytical curve need be performed only once, and similarly for the evaluation of $\tau_0$. It is also to be noted that a simple calculation is required to extract $S_0$ from the measurements on the quenched sample, since the algorithm contains the measured value for S, the value for $\tau$ obtained from the measurement of $\delta$, and the value of $\tau_0$ obtained from the measurement of $\delta_0$ for an unquenched sample of luminescent species.

Benefits and advantages of the present invention include the reduction in complexity over pulsed methods, and the avoidance of extra sample handling steps required for the dilution and the standard addition methods.

BRIEF DESCRIPTION OF THE DRAWINGS

The accompanying drawings, which are incorporated in and form a part of the specification, illustrate two embodiments of the present invention and, together with the description, serve to explain the principles of the invention. In the drawings.

DETAILED DESCRIPTION OF THE INVENTION

Reference will now be made in detail to the present preferred embodiments of the invention, examples of which are illustrated in the accompanying drawings. Briefly, the present invention includes two methods for eliminating the quenching of a luminescent species (uranyl ion as an example) by a quenching species (chloride ion as an example). The first method takes advantage of the inverse relationship between luminescence lifetime and the percentage of signal modulation at a chosen modulation frequency. If the modulation frequency is sufficiently high, the observed modulated amplitude, S, is essentially independent of the extent of quenching. In the second method, the modulated amplitude S and the phase delay for the quenched sample are measured and the unquenched signal, $S_0$, computed from these quantities.

If a sample is excited with a sinusoidally varying source, the sample emission will vary sinusoidally. The emission will, however, be phase-shifted from the excitation, and the degree of modulation of the emission will be lower than the degree of modulation of the excitation source. These differences arise from the inability of the excited-state concentration to follow the excitation. The phase shift, $\delta$, and the degree or percentage of emission modulation, m, are given by:

$$\delta = \tan^{-1}(2\pi f \tau), \text{ and} \quad (1)$$

$$m = M/[1 + (2\pi f \tau)^2]^{\frac{1}{2}}, \quad (2)$$

where f is the modulation frequency, $\tau$ is the excited-state lifetime, and M is the degree of excitation modulation. If the excitation is not sinusoidal, the waveform is decomposed into its Fourier components and a series of equations similar to Equations 1 and 2 is derived for the fundamental and harmonics. Since it is possible to discriminate instrumentally against the harmonics, only the fundamental frequency will be considered hereinbelow. Either of Equations 1 and 2 may be used to evaluate $\tau$.

Figure 1:
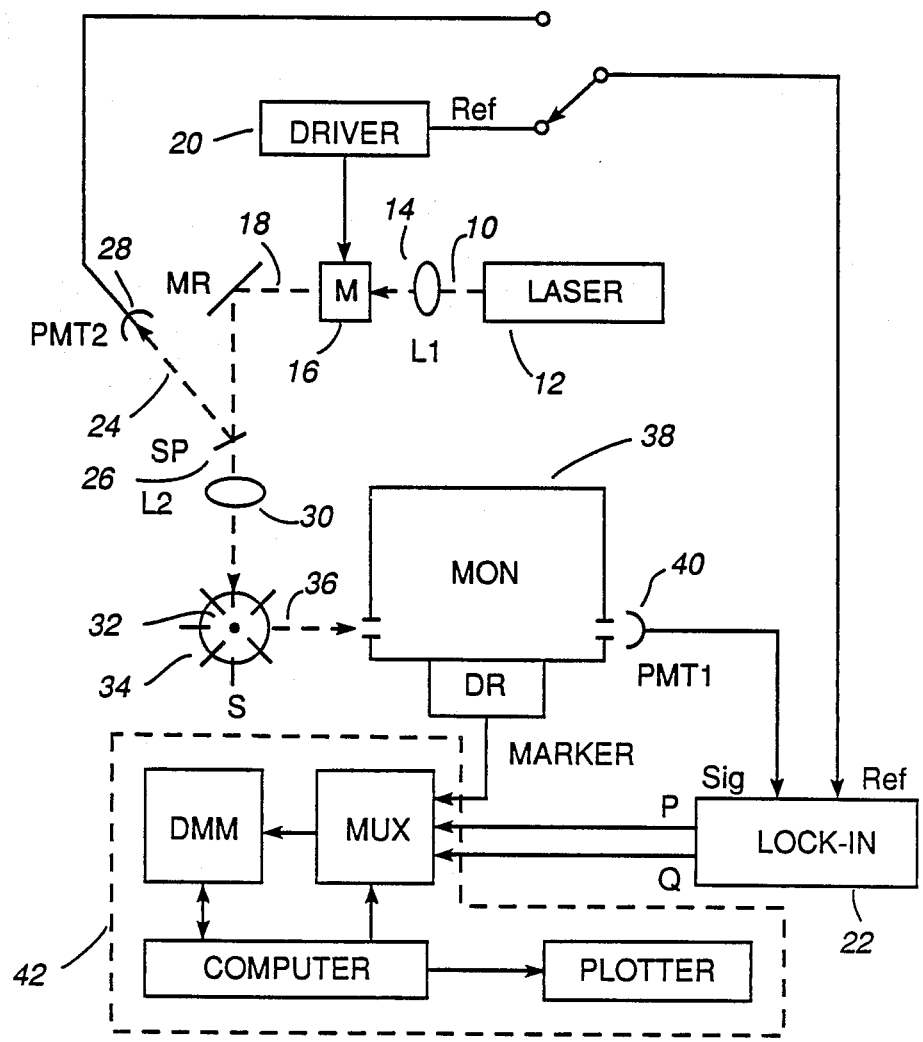
FIG. 1 is a schematic representation of the phase-resolved spectrometer according to the teachings of the present invention.

FIG. 1 shows a schematic representation of the apparatus of the present invention. For a full description of the apparatus, kindly refer to "Enhancement of Luminescence and Raman Spectroscopy by Phase-Resolved Background Suppression," by J. N. Demas and R. A. Keller, Anal. Chem. 57, 538 (1985), the disclosure of which is hereby incorporated by reference herein. Basically, the excitation beam is modulated before it enters the sample, and the photomultiplier tube signal is processed using a lock-in amplifier referenced to the modulation frequency. More specifically, the output beam 10 from laser 12 is focused using lens 14 into acoustooptic modulator 16 producing thereby a square-wave modulated output 18. At low frequencies, the internal oscillator circuitry of driver 20 was found to be adequate to control modulator 16 and provide a reference signal for dual-channel phase-sensitive detector 22. However, at higher frequencies, excessive phase noise developed, and an optical triggering arrangement was employed using a portion of the laser beam 24 which was reflected from beam splitter 26 onto photomultiplier tube 28 from which the triggering signal was derived. Lens 30 was employed to focus the modulated laser output beam 18 into sample 32 contained in sample holder 34. Modulated luminescence emitted light 36 emerging from the sample was analyzed using monochrometer 38 and detected by photomultiplier tube 40. The signal therefrom was directed to phase-sensitive detector 22. Data acquisition system 42 received the output from phase-sensitive detector 22 for processing.

The analysis of the emission signal according to the teachings of the present invention rests on the assumption that the quenching arises from diffusional (dynamic) quenching and not from ground-state associational quenching. Under these conditions $\tau$ and the total emission intensity are related by:

$$I/I_0 = \tau/\tau_0, \quad (3)$$

where I is the total luminescence intensity at dc or very low modulation frequencies, and the subscript 0 denotes the unquenched value of the quantity.

The first embodiment of the present invention relies on the opposing effect between $\tau$ and the percentage of signal modulation. Increased quenching decreases $\tau$ while m increases. Therefore, as the quenching process decreases the total emission yield, some of the lost intensity is regained in the detected modulated amplitude because of the higher percentage modulation. Moreover, operation at high frequencies can largely eliminate the detrimental effects of even extensive quenching.

The observed modulated emission signal as a function of f and the extent of dynamic quenching is given by:

$$S = S_0/[(1/\phi)^2 + A^2]^{\frac{1}{2}}, \quad (4)$$

$$S = S_{0f}\{(1 + A^2)/[(1/\phi)^2 + A^2]\}^{\frac{1}{2}}, \quad (5)$$

$$A = 2\pi f \tau_0, \text{ and} \quad (6)$$

$$\phi = \tau/\tau_0, \quad (7)$$

where S is the observed modulated amplitude and $S_0$ is the modulated amplitude for an unquenched sample at very low modulation frequencies, f. $S_{0f}$ is the unquenched signal at f. $\phi$ is the extent of quenching, which is also the low-frequency emission intensity of a quenched sample relative to that of an unquenched one, since at very low frequencies, $S/S_0 = I/I_0$.

Figure 2:
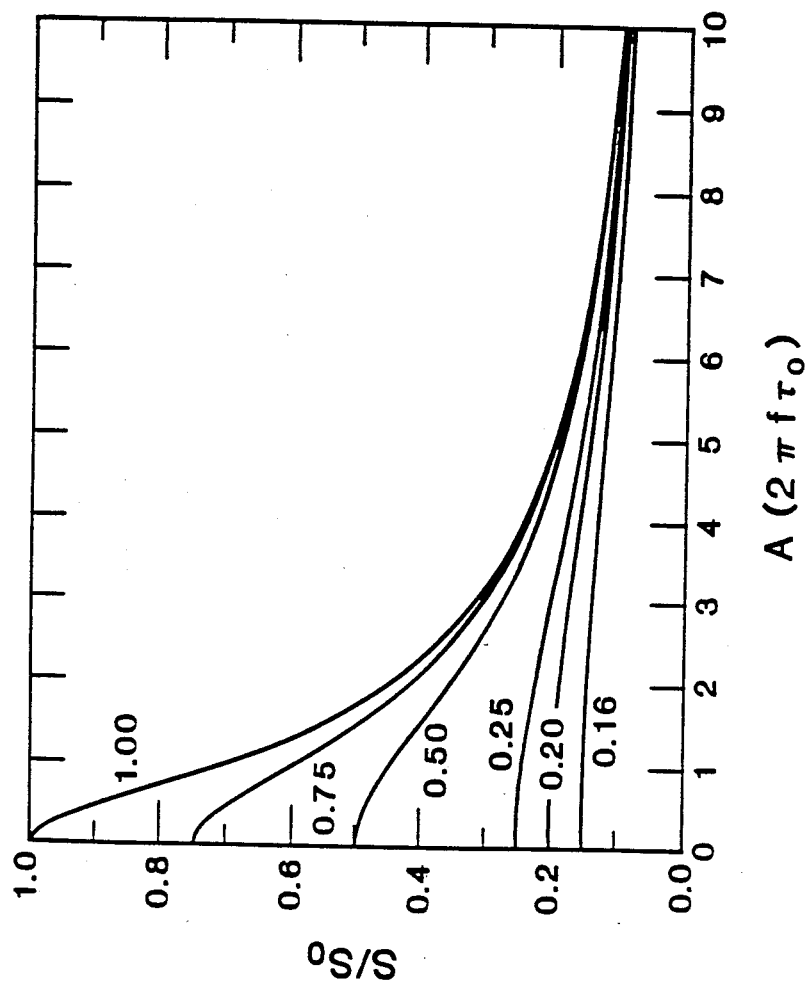
FIG. 2 shows the variation of the normalized signal, $S/S_0$ as a function of $A = 2\pi f \tau_0$ and the extent of quenching $\phi$ indicated by each curve.

Turning now to FIG. 2 hereof, $S/S_0$ is plotted versus the dimensionless, normalized frequency, A, for several values of $\phi$. It is readily observed that at very low frequencies (A≈0), S decreases most with changes in the extent of quenching. As f increases, however, the differences between the successive curves for decreasing values of $\phi$ become progressively smaller, and all of the curves approach one another. Thus, by modulation of the signal at sufficiently high frequencies, the measured signal becomes essentially independent of the extent of quenching. The $S_0$ derived therefrom for a sample having unknown luminescent species concentration can then be related to the actual concentration thereof using an independently generated calibration curve.

The second embodiment of the present invention relies on the fact that in the use of a dual-channel phase-sensitive detector, one can simultaneously determine the modulated amplitude, S, and the phase shift $\delta$, of the emission signal relative to the excitation source. Once S and $\delta$ are known, the unquenched modulated intensity at zero modulation frequency, $S_0$, is calculated using Equations 1–7 hereof. This procedure does require a determination of $\tau_0$ in the analysis medium but this may readily be accomplished using a reference sample. Once $\tau_0$ is obtained, it is generally unnecessary to remeasure it for every experiment.

Both embodiments of the present invention rely on the measurement of the ac signal amplitude with noise or variations in the phase angle reduced as much as possible. Dual-channel lock-in amplifiers provide this capability. Such an amplifier can be simply described as containing two normal lock-in amplifiers. One amplifier processes the in-phase signal; that is, in phase with the reference signal, while the other amplifier processes the signal relative to a 90° phase-shifted reference. The two outputs are denoted by the in-phase, P, and quadrature, Q, signals, respectively. The vector sum of the P and Q signals is S. The phase shift, δ, relative to the reference and S are given by:

$$S = (P^2 + Q^2)^{\frac{1}{2}}, \text{ and} \tag{8}$$

$$\delta = \tan^{-1}(Q/P), \tag{9}$$

where S is the modulated amplitude in Equations 4 and 5 hereof. It should be pointed out that the first embodiment of the present invention requires only a single channel amplifier.

The method of the present invention is further illustrated by the following example.

EXAMPLE

As an example of the advantages of the present invention and a specific situation in which it is utilized, results based on the quenching of the $UO_2^+$ luminescence are presented. Details of the measurements are described in "Elimination of Quenching Effects in Luminescence Spectrometry by Phase Resolution," by J. N. Demas, W. M. Jones, and R. A. Keller, Anal. Chem. 58 1717 (1986), the disclosure thereof being hereby incorporated by reference herein. Uranyl solutions were prepared by the dissolution of high-purity $U_3O_8$ in concentrated $HNO_3$ and subsequently in 1.00M $H_3PO_4$. All measurements were at 80 ppm of U. KCl was used as a source of chloride ion quencher. Quenched solutions were identical to the unquenched solutions except for the addition of the quencher. Phase angle and vector amplitude measurements were made at 0.1, 0.8, 1, 2, 3, 4, 5, 6, 8, 10, 15, 20, and 30 kHz. The determination of the τ's from Equation 1 hereof required phase-angle shifts between the excitation and the emission radiation to be measured. Since the oscillator, the modulator, and the amplifier introduce phase shifts, it was necessary to obtain a reference phase shift for a zero-lifetime emitter. This was accomplished using aqueous rhodamine 6G which has a fluorescence lifetime of 3-ns, which is essentially instantaneous relative to that for the $UO_2^+$ which has a multimiscrosecond τ. Because the phase shift of the amplifier varied with the sensitivity range and the frequency, phase shifts were measured for all frequencies and ranges used. A comparison using intensity and τ Stern-Volmer plots for quenching of $UO_2^+$ by chloride showed the two results to be indistinguishable. Thus, significant static quenching was ruled out.

Figure 3:
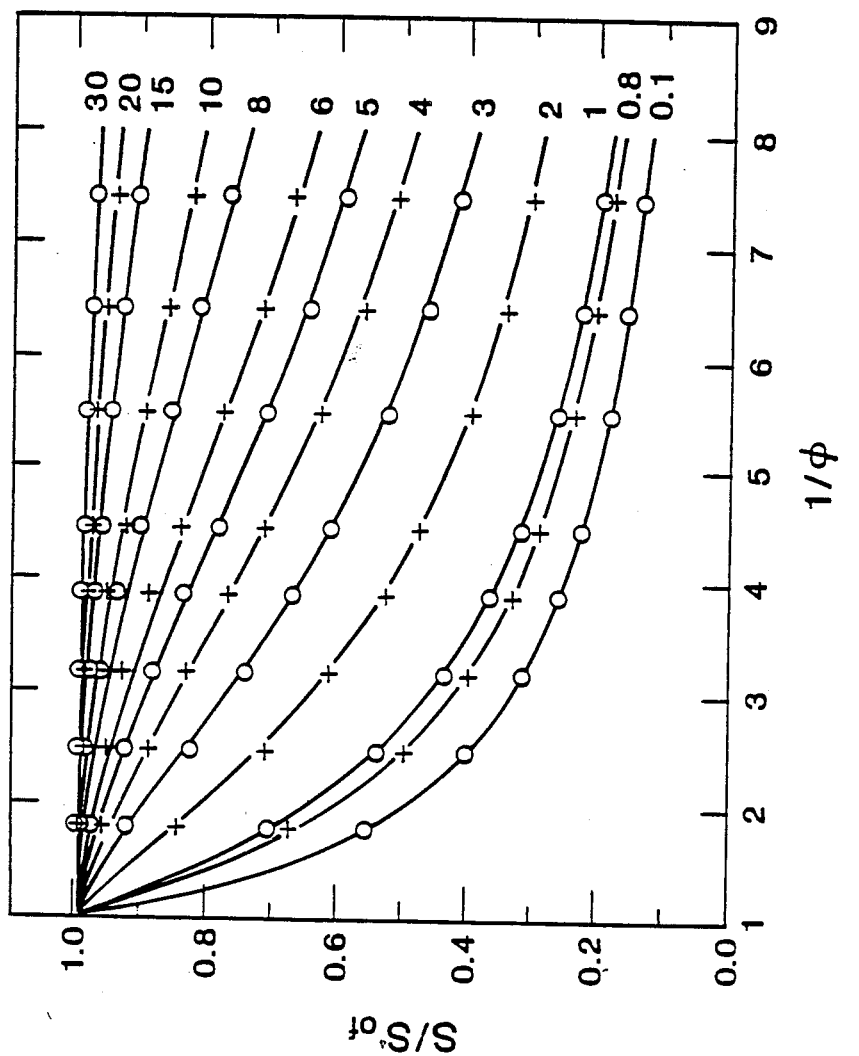
FIG. 3 shows the variation of the normalized modulated amplitudes as a function of $1/\phi$ and modulation frequency (in kHz indicated by each curve).

Returning now to FIG. 3 hereof, the experimentally measured plots of the normalized signal $S/S_{0f}$ versus φ and f and the solid lines, which represent theoretical curves calculated from Equation 5 hereof and the measured value of $\tau_0$, agree without the introduction of adjustable parameters. The performance of the method can be evaluated by the variation in corrected luminescence amplitudes for a number of samples with different extents of quenching. For the first embodiment hereof the directly obtained intensities, S's, were used, while for the second embodiment the measured values of the S's and δ's for each frequency were used to generate intensities $S_0$ corrected to zero frequency using Equations 1 and 4 hereof. The data are summarized in the following Table.

Mean and standard deviations were calculated for nine data points ranging from unquenched to 87% quenched samples. All data were taken at 80 ppm U in 1.00M phosphoric acid. As can be seen from the Table, embodiment 1 hereof improves as f increases. The σ's improve significantly for f ≧ 8.00 kHz and represent systematic errors rather than noise. This is expected from the use of Equation 5 hereof, since S is only insensitive to A when $A > \phi^{-1}$. As a result of the significant $Cl^-$ quenching ($\phi^{-1}max = 7.4$), A exceeded the maximum $\phi^{-1}$ only above 8 kHz. Above 8 kHz the reduction of quenching effects becomes quite dramatic due to the sum-of-squares form of Equation 5 hereof. For less heavily quenched samples, the necessary frequency is correspondingly reduced. This reduction in sensitivity to quenching is accompanied by a loss of signal amplitude. For example, at 30 kHz the signal is reduced to 9% of the low-frequency value. However, the relative standard deviation is improved by a factor of 100.

TABLE

Effect of Modulation Frequency on the Elimination of Quenching Effects

| f(kHz) | S ± σ (Embodiment 1) (σ/S, %) | (mV) | $S_0$ ± σ (Embodiment 2) ($\sigma/S_o$, %) | (mV) |
| --- | --- | --- | --- | --- |
| 0.100 | 3.31 ± 2.54 | (77) | 8.06 ± 2.71 | (34) |
| 0.800 | 2.97 ± 1.87 | (63) | 9.46 ± 0.33 | (3.5) |
| 1.000 | 2.82 ± 1.65 | (59) | 9.37 ± 0.23 | (2.5) |
| 2.000 | 2.28 ± 0.93 | (41) | 9.61 ± 0.13 | (1.4) |
| 3.000 | 1.89 ± 0.56 | (30) | 9.69 ± 0.21 | (2.2) |
| 4.000 | 1.60 ± 0.36 | (23) | 9.67 ± 0.17 | (1.8) |
| 5.000 | 1.38 ± 0.24 | (18) | 9.70 ± 0.17 | (1.8) |
| 6.000 | 1.22 ± 0.17 | (14) | 9.57 ± 0.10 | (1.0) |
| 8.00 | 0.965 ± 0.091 | (9) | 9.63 ± 0.12 | (1.3) |
| 10.00 | 0.807 ± 0.052 | (6) | 9.64 ± 0.12 | (1.2) |
| 15.00 | 0.560 ± 0.019 | (3.4) | 9.61 ± 0.08 | (0.8) |
| 20.00 | 0.429 ± 0.009 | (1.9) | 9.67 ± 0.11 | (1.1) |
| 30.00 | 0.289 ± 0.002 | (0.7) | 9.68 ± 0.16 | (1.7) |

The second embodiment hereof yields excellent recovery of the true $S_0$ ($\approx 9.6$ mV) as judged by the mean and standard deviations except at 0.1 kHz where δ is very small. As a general rule, analyses should be performed at a frequency where $2\pi f \tau \geq 1$. The σ's for the second embodiment largely reflect noise in the measured δ's and amplitude measurements since there are no inherent systematic errors. There are large σ's at low f values, which decrease as f increases.

In conclusion the embodiments of the present invention are well-suited for extracting quenching-corrected intensities from heavily quenched samples. Errors approaching an order of magnitude in estimated concentrations are reduced to a few percent by either method. With currently available phase-sensitive detectors and modulators, $\tau_0$'s as short as 30 ns yield $2\pi f \tau = 9.4$, which is adequate even for heavily quenched samples. Cross-correlation techniques can extend this method to the gigaHertz frequency range even with the use of low-frequency lock-in amplifiers. The first embodiment hereof requires no computations beyond those performed in a dual channel lock-in amplifier. The vector output of the amplifier is the desired signal. Alternatively, the information can be obtained from a single channel amplifier by manually choosing the phase angle to maximize the signal. Moreover, knowledge of $\tau_0$ is not required. The sole requirement is that $A > \phi^{-1}$. That this condition is satisfied is readily determined from the signals from the lock-in amplifier. This permits the frequency to be adjusted to satisfy the requirements of the particular system under investigation. The second embodiment requires more elaborate computations than the first embodiment hereof and requires the independent measurement of the unquenched τ, $\tau_0$, in the analytical medium and the instrumental zero-lifetime phase angle. However, these measurements would only have to be made occasionally. The required calculations can easily be performed by use of a microprocessor.

The foregoing description of two preferred embodiments of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with such various modifications as are suited to the particular use contemplated. It is intended that the scope of the invention be defined by the claims appended hereto.

What we claim is:

1. A method for substantially reducing quenching effects in the performance of luminescence spectrometry on a sample containing at least one luminescent species for which the concentration is to be determined and at least one quenching species, said method comprising the steps of:
   a. exciting the sample of interest with a modulated source of electromagnetic radiation having a chosen wavelength;
   b. selecting the frequency of modulation such that luminescent emission resulting from the interaction of the electromagnetic radiation with the sample is substantially independent of the extent of quenching by the quenching species;
   c. observing the modulated luminescent emission signal from the sample at the selected modulation frequency;
   d. determining unquenched modulated luminescent emission signal from the at least one luminescent species in the sample of interest according to the algorithm:

$$S = S_{0f}\{(1+A^2)/[(1/\phi)^2 + A^2]\}^{\frac{1}{2}},$$

where S is the observed modulated luminescent emission amplitude and $S_{of}$ is the desired unquenched value thereof at the chosen modulation frequency f, $A = 2\pi f \tau_0$, and $\phi$ is the extent of quenching and is equal to $\tau/\tau_0$, where $\tau$ is the quenched excited-state lifetime and $\tau_0$ is the unquenched value thereof; and
   e. using the determined value of $S_{0f}$ to determine the concentration of the luminescent specie of interest.

2. The method as described in claim 1, further comprising the steps of:
   i. preparing a series of solutions each of which includes a chosen, fixed concentration of the luminescent species of interest and a known concentration of the quenching species, there being solutions with several different concentrations of interfering quenching species covering the range expected in the analyses;
   ii. exciting each of the samples in turn with a modulated source of electromagnetic radiation having a chosen wavelength and a chosen modulation frequency;
   iii. observing the modulated emission signal from each of the excited samples resulting from the interaction of the modulated electromagnetic radiation with the sample as a function of the chosen modulation frequency; and
   iv. increasing the chosen modulation frequency until the observed modulated luminescence emission becomes substantially independent of the extent of quenching and substantially the same for all of the prepared solutions having the same concentration of the luminescent species, such that the value of the frequency of modulation for substantially reducing the effects of quenching species in the performance of luminescence spectroscopy on a sample containing at least one luminescent species in the presence of at least one quenching species is determined.

3. The method as described in claim 1, further comprising the steps of:
   i. preparing a series of solutions containing known quantities of luminescent species in the absence of quenching species;
   ii. exciting each of the samples in turn with a modulated source of electromagnetic radiation having a chosen wavelength and a chosen modulation frequency;
   iii. observing the modulated luminescent emission signal from each of the excited samples resulting from the interaction of the modulated electromagnetic radiation with the sample as a function of the chosen modulation frequency; and
   iv. determining the unquenched modulated luminescence signal therefrom at the modulation frequency at which the effects of quenching species on the observed modulated luminescent emission are eliminated, such that an analytical curve for the luminescent species is obtained.

4. The method as described in claim 1, wherein the chosen modulation frequency is determined from the relationship $A \gg 1$, such that the observed modulated luminescent emission amplitude, S, is substantially independent of extent of quenching, $\phi$.

5. A method for substantially reducing quenching effects in the performance of luminescence spectrometry on a sample containing at least one luminescent species for which the concentration is to be determined and at least one quenching species, said method compising the steps of:
   a. exciting the sample of interest with a modulated source of electromagnetic radiation having a chosen wavelength and having a modulation frequency, f, such that $2\pi f \tau$ is approximately equal to 1, where $\tau$ is the quenched excited-state lifetime;
   b. simultaneously measuring the modulated amplitude of the emission signal, and the phase shift of the emission relative to the excitation source;
   c. determining the unquenched modulated luminescence emission from the at least one luminescent species in the sample of interest according to:

$$S = (P^2 + Q^2)^{\frac{1}{2}}, \text{ and } \delta = \tan^{-1}(Q/P),$$

where P and Q are the in-phase and quadrature signals, respectively, measured using a phase-sensitive detector, and $\delta$ is the phase shift of signal relative to the reference signal and is equal to $\tan^{-1}(2\pi f \tau)$, S is the modulated amplitude which is related to the unquenched, frequency modulated amplitude according to the algorithm:

$$S = S_0/[(1/\phi)^2 + A^2]^{\frac{1}{2}},$$

where $S_0$ is the desired unquenched modulated amplitude, $A = 2\pi f \tau_0$, and $\phi$ is the extent of quenching and is equal to $\tau/\tau_0$, and $\tau_0$ is the unquenched value of the excited-state lifetime; and d. using the determined value of $S_0$ to determine the concentration of the luminescent specie of interest.

6. The method as described in claim 5, further comprising the steps of:

i. preparing a series of solutions having known concentrations of luminescent species in the absence of quenching species;

ii. exciting each of the solutions in the series in turn with a modulated source of electromagnetic radiation having a chosen wavelength at modulation frequencies, f, such that $2\pi f \tau$ is approximately equal to 1;

iii. simultaneously observing the modulated luminescent emission signal and the phase shift of the luminescent emission relative to the excitation source from each of the excited solutions resulting from the interaction of the modulated electromagnetic radiation with the solution; and iv. determining the unquenched modulated luminescence emission amplitude for each solution in the series, such that an analytical curve for the luminescent species is generated.

7. The method as described in claim 5, further comprising the steps of:

i. preparing a solution having a known concentration of luminescent species in the absence of quenching species;

ii. exciting each of the solutions in the series in turn with a modulated source of electromagnetic radiation having a chosen wavelength at modulation frequencies, f, such that $2\pi f \tau$ is approximately equal to 1;

iii. measuring the phase shift, $\delta_0$, the luminescent emission relative to the excitation source from the excited solution resulting from the interaction of the modulated electromagnetic radiation with the solution; and iv. determining $\tau_0$ from the relation:

$$\tau_0 = (\tfrac{1}{2}\pi f) \tan \delta_0.$$

* * * * *